(12) United States Patent
Effing

(10) Patent No.: US 12,342,056 B2
(45) Date of Patent: Jun. 24, 2025

(54) METHOD FOR SYNCHRONIZING THE PLAYBACK OF AN AUDIO FILE WITH AN ASSOCIATED VIDEO FILE

(71) Applicant: Nubart GmbH, Berlin (DE)

(72) Inventor: Simon Effing, Berlin (DE)

(73) Assignee: Nubart GmbH, Berlin (DE)

( * ) Notice: Subject to any disclaimer, the term of this patent is extended or adjusted under 35 U.S.C. 154(b) by 0 days.

(21) Appl. No.: 18/043,644

(22) PCT Filed: Sep. 2, 2021

(86) PCT No.: PCT/EP2021/074293
§ 371 (c)(1),
(2) Date: Mar. 1, 2023

(87) PCT Pub. No.: WO2022/049210
PCT Pub. Date: Mar. 10, 2022

(65) Prior Publication Data
US 2023/0353845 A1    Nov. 2, 2023

Related U.S. Application Data

(60) Provisional application No. 63/073,589, filed on Sep. 2, 2020.

(51) Int. Cl.
*H04N 7/16*        (2011.01)
*H04N 21/43*       (2011.01)
*H04N 21/8547*     (2011.01)

(52) U.S. Cl.
CPC ..... *H04N 21/8547* (2013.01); *H04N 21/4302* (2013.01)

(58) Field of Classification Search
CPC ........... H04N 21/8547; H04N 21/4302; H04N 21/414; H04N 21/41407; H04N 21/41415; H04N 21/4307; H04N 21/4622; H04N 21/8106; G03B 31/04
See application file for complete search history.

(56) References Cited

U.S. PATENT DOCUMENTS 10,536,741 B1   1/2020  Madison et al.
2008/0040759 A1* 2/2008 She ................. H04L 65/1043
                                                725/74

FOREIGN PATENT DOCUMENTS

EP    3121650 A1    1/2017
ES    2695398 A1    1/2019
WO    2012018300 A2 2/2012
WO    2014128360 A1 8/2014

OTHER PUBLICATIONS

European Patent Office, International Search Report, PCT/EP2021/074293, Mail Date Dec. 23, 2021, 3 pages.

* cited by examiner

*Primary Examiner* — Gigi L Dubasky
(74) *Attorney, Agent, or Firm* — Ziegler IP Law Group, LLC

(57) ABSTRACT

The present invention relates to a method for the synchronization of the playback of an audio file with the playback of a related video file, and particularly to the method for synchronizing a video and an audio file being simultaneously reproduced by a video client player and an audio client player, respectively, by means of computing an audio playback position with video playback position signals and timestamp signals received from the video client player and a server hosting a web application.

20 Claims, 2 Drawing Sheets

METHOD FOR SYNCHRONIZING THE PLAYBACK OF AN AUDIO FILE WITH AN ASSOCIATED VIDEO FILE

OBJECT OF THE INVENTION

The present invention relates to a method for the synchronization of the playback of an audio file with the playback of a related video file, and particularly to the method for synchronizing a video and an audio file being simultaneously reproduced by a video client player and an audio client player, respectively, by means of computing an audio playback position with video playback position signals and timestamp signals received from the video client player and a server hosting a web application.

BACKGROUND OF THE INVENTION

Currently, there are a number of solutions for providing synchronized audio content for end-users in public venues and facilities, such as museums and exhibition halls. Some of these solutions use dedicated handheld devices for the reproduction of pre-recorded audio files, but these known methods fail to meet the needs of the industry because the devices must be handed out to the users, collected after the use or event, and then charged, and maintained or in some cases repaired, not to mention the hygienic considerations related to its use by a high number of users.

Other solutions attempt to apply Wi-Fi broadcast to the end-user's mobile devices, but these solutions are similarly unable to meet the needs of the industry because it requires setting up a special on-site Wi-Fi infrastructure connected to the video playback and the users need to install a dedicated native app on their personal mobile devices. Therefore, it is apparent that there is a demand for a method which overcomes the above-mentioned problems in a cost-efficient and effective manner.

DESCRIPTION OF THE INVENTION

In an inventive aspect, the invention provides a method for synchronizing the playback of an audio file with an associated video file in a computer network comprising:
an audio client player configured to playback the audio file,
a video client player configured to playback the video file, and
a server hosting a web application, the server comprising a data store;
wherein the method comprises the steps of:
requesting, by the audio client player, a video playback position (VP) to the web application,
receiving, by the audio client player, the video playback position (VP), the timestamp at reception (RTS) and the current timestamp (CTS) from the web application, and
computing, by the audio client player, an audio playback position (AP) with the video playback position (VP), the timestamp at reception (RTS) and the current timestamp (CTS);
wherein the audio playback position is computed according to:

audio playback position (AP)=video playback position (VP)+$k$·(current timestamp (CTS)−timestamp at reception (RTS)), with $k \geq 0$.

Throughout the present document, it must be understood that the audio client player is hosted in a user device, preferably in a mobile device, such as a smartphone or a tablet, while the video client player is hosted by a different, separated device, such as a computer or a smart television; the video client player can be hosted in the server which hosts the web application. By audio and video client player must be understood the software elements which enable, at least, the playback or reproduction of an audio or video file; according to the method of the present invention, the audio and video client players are also capable of managing the sending, receiving and/or processing of signals, in particular signals related to the playback of the audio or the video file. By web application must be understood a software element, hosted in the server, capable of managing the playback and the synchronization of the audio and video file, and it must be understood that the web application has data communication capabilities with the client players, preferably over internet, but it can also make use of wired connections.

By video or audio playback position must be understood the time lapsed since the beginning of the playback of the audio or video file. By timestamp or time stamp must be understood a piece of data generated by a computer which reflects the date and time of a particular instant; preferably the time stamps are preferably generated by the server and/or the device hosting the audio client player upon occurrence of an event, such as the reception of a playback position. The timestamps may have a different starting time as the video or audio playback, and thus the computation of the audio playback position considers differences of timestamps to synchronize the audio playback position.

The audio playback position computation yields a playback position to set the reproduction of the audio file such that the audio is synchronized with the video being reproduced in a separate device, irrespective of the instant the audio or video files begin their reproduction. The computation considers the position of the video playback at given moment, pinpointed by a server timestamp, and subtracts the time lapsed until the video playback position is requested by the audio client player, this latter time calculated as the increment of timestamps:

Audio playback position (AP)=video playback position (VP)+(current server timestamp (CTS)−server timestamp at reception (RTS)

This audio playback position may be corrected with the inclusion of further factors, namely including additional latency values corresponding to the reception and processing of the data by the audio client player or the server; some relevant latencies and offset values are discussed below.

Preferably, the web-application provides:
a) the video playback website including an HTML5 video element and a client-side script that periodically sends the current video playback position to the web server.
b) the audio playback website including an HTML5 audio element and a client-side script that collects sync information periodically and can also receive server sent events.
c) a web endpoint to receive and store the video sync signal.
d) a web endpoint to answer requests from the audio client-side script about the last video position.
e) a web endpoint that emits server sent events for the audio client-side script about real time video events (start, stop, ended, rewind).

Advantageously, the invention provides for a method for synchronizing audio playback in a browser with video playback in another browser on a different device by transmitting video playback positions through a back-end web-server.

The disclosed method is unique when compared with other known systems and solutions in that it provides a "Bring Your Own Device—BYOD" solution for both end-users and administrators. Similarly, the method disclosed is unique when compared with other known solutions in that it does not require the use of dedicated hardware.

The disclosed method is also unique in that the overall architecture of the system is different from other known systems. More specifically, it provides i) a simple web interface for the administrator to playback the video ii) a simple web interface for the end-user to playback the audio in sync with the video and iii) a server backend, that provides the web application and the signalling channel for synchronization. Similarly, the software associated with the method is unique in that is incorporates protection of video content and synchronization signalling through administrator authentication.

In a particular embodiment, the method further comprises the steps of:
obtaining, by the audio client player, a current audio playback position (CAP) of the audio file, and
when the absolute difference between the current audio playback position (CAP) and the computed audio playback position (AP) is higher than a certain threshold (TH),
setting, by the audio client player, the audio playback at the computed audio playback position (AP).

In a particular embodiment, the method further comprises the steps of:
computing, by the audio client player, an audio client offset (AO) to compensate client side delays, and
adding, by the audio client player, the audio client offset (AO) to the audio playback position (AP).

The audio client offset (AO) is the audio client specific delay when setting the playback position, caused by the client browser, OS and hardware, which is constantly measured and then added to the requested playback position. For example, when the audio player is playing a track, if the client code sets the requested position to 10 seconds, and two seconds later the code detects the player is at position 11 seconds instead of 12 seconds, this will mean the player is 1 second behind, so the client offset (AO) would be set to 1 second; then, if for example, the next time the audio is requested to be at position 20 seconds, it will be set to 21 seconds, to compensate this client specific delay.

In a particular embodiment, the method further comprises the step of:
receiving, by the audio client player, a video playback position request delay time (RD), adding, by the audio client player, the position request delay time (RD) to the audio playback position (AP).

The request delay time (RD) in is the network latency when getting the current video playback position by the audio client. The time the request takes (server call duration) is part of the equation to compensate any network latency.

In a particular embodiment, the method further comprises the step of:
authenticating the audio client player with the web application.

In a particular embodiment, the method further comprises the step of:
sending, by the video client player, a video playback position (VP) of the video file to the web application, In a particular embodiment, the method further comprises the step of:
storing, by the web application, the video playback position (VP) of the video file and a timestamp at reception (RTS) in the data store.

In a particular embodiment, the method further comprises the steps of:
sending, by the video client player, reproduction event signals corresponding to the status of the video playback to the web application, and
sending, by the web application, reproduction event signals to the audio client player.

In a particular embodiment, the method comprises the step of:
periodically sending, by the video client player, video playback position (VP) of the video file to the web application.

In a particular embodiment, the method comprises the step of:
periodically requesting, by the audio client player, video playback positions (VP) to the web application.

In a particular embodiment, wherein the video playback position, the current video playback position (VP) the timestamp at reception (RTS), the current timestamp (CTS), and/or the reproduction event signals is an encrypted file.

In a particular embodiment, the video client player is hosted in the server or is hosted in a video playback device.

In a particular embodiment, wherein the audio client player is hosted in a mobile device.

In a particular embodiment, the video file is stored in the server or is hosted in a video playback device.

In a particular embodiment, the server and/or the audio client player hosts a plurality of audio files, each audio file corresponding to a different language.

In a particular embodiment, the video client player and/or the audio client player are encrypted or protected by user credentials.

In a particular embodiment, the computer network comprises a plurality of synchronized video client players.

In a particular embodiment, the value k is from 0.9 to 1.1, and preferably the value k is 1.0.

In a particular embodiment, the threshold (TH) value is from 5 ms to 350 ms.

In a preferred embodiment, the video file can be streamed over the Internet or loaded from a local storage medium, and/or the video is streamed from a third-party provider.

In a preferred embodiment, the client-side script sends additional video event signals (start, stop, ended, rewind) to the web-server, and or the client-side script calculates the target audio playback position by requesting the last video position from the server and calculating the position as follows: ((current server time–stamp–server time-stamp when signal received)+last video playback position+server request duration), and/or the client-side script regularly measures the client-side latency for adjusting the playback time by comparing the current player position with the required player position according to the last adjustment and elapsed time since this adjustment, and/or the client-side script uses the measured client-side latency as an offset to be added when adjusting the player position, and/or the client side adapts the interval until next synchronization according to the result. If the current audio playback lies with the tolerance the interval can be longer, otherwise shorter.

In a preferred embodiment, access to the video player website is protected by user credentials.

In a preferred embodiment, access to the web endpoint is protected by user credentials.

In a preferred embodiment, the sever stores its current time stamp-with the received video position, and/or the sever responds with the last received video position, the time-stamp when it was received and its current time-stamp, and/or the web-server provides additional secondary video playback websites that synchronize to the main video using the same method as the audio playback.

In a preferred embodiment, the audio player's position is only adjusted if the difference to the calculated target position exceeds a specific tolerance, or threshold, to avoid unnecessary dropouts. Preferably, the tolerance is different if the audio position is ahead or behind the video position.

DESCRIPTION OF THE DRAWINGS

The foregoing and other advantages and features will be more fully understood from the following detailed description of exemplary embodiments with reference to the accompanying drawings, which should be considered by way of illustration and not limitation, in which.

PREFERRED EMBODIMENT OF THE INVENTION

Figure 1:
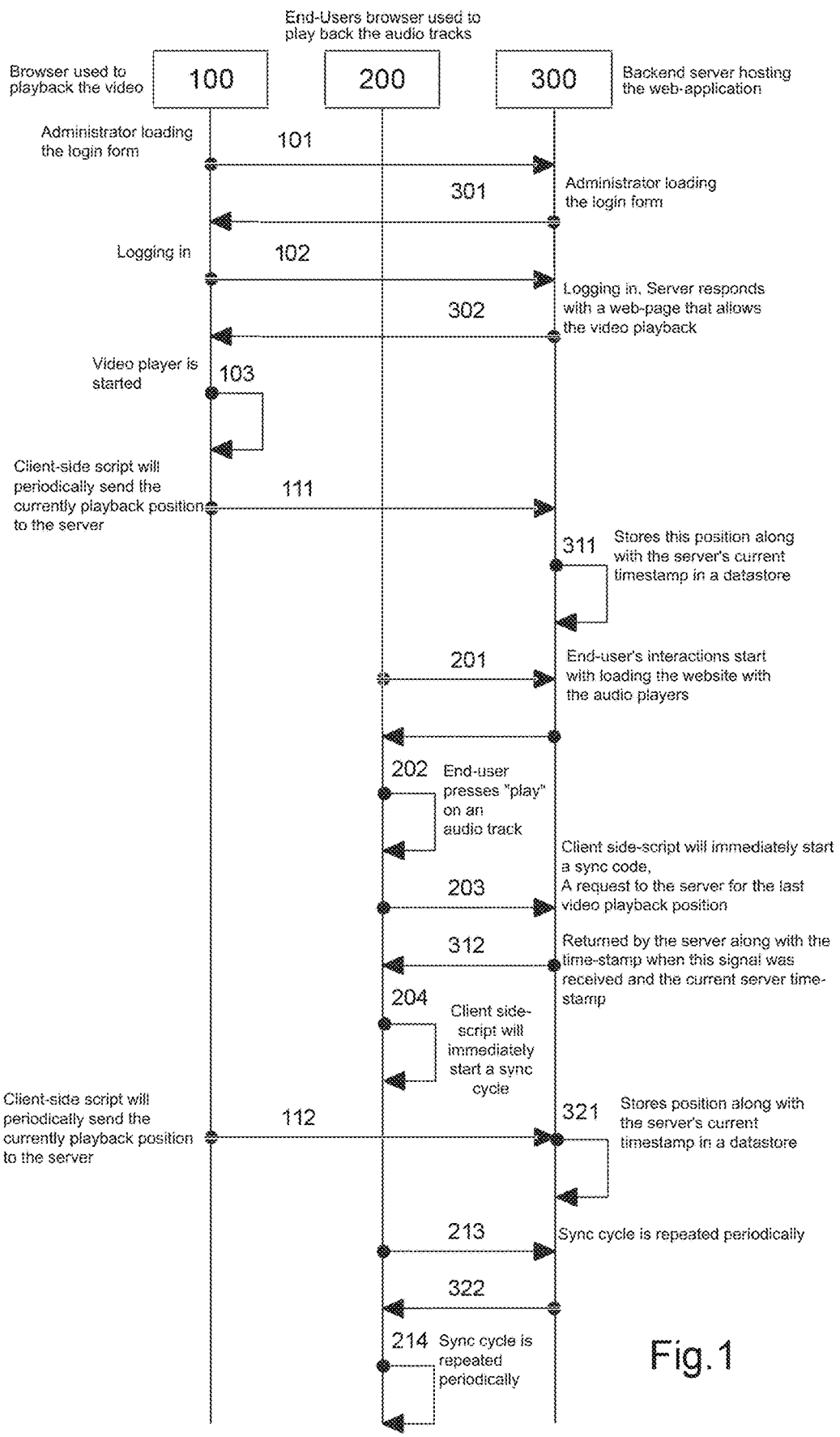
FIG. 1 This figure represents a sequence diagram of an embodiment of the method.

Throughout the present document it will be understood that various parts of one embodiment of the invention can be freely combined with parts described in other embodiments, even being said combination not explicitly described, provided there is no harm in such combination.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The invention may, however, be embodied in many different forms and should not be construed as being limited to the embodiments set forth herein; rather, these embodiments are provided by way of illustration only and so that this disclosure will be thorough, complete and fully convey understanding to those skilled in the art.

In a preferred example of the invention, the method allows for the synchronization of audio playback on end-users' mobile devices in sync with the video playback on an external screen. In a preferred embodiment, the method is implemented by means of a webapp where an administrator can log in and start the video, either streamed from a video file hosted by the webapp or from a video file located on the used computer to access the webapp. The video website, which embeds an HTML5 video element to playback the video, also has client-side JavaScript that periodically sends HTTP POST requests to the webapp's server, containing information about the video-players current position. The client-side script also sends information about play, pause, ended and rewind events of the video player. The server only accepts these requests with the administrator's login session in order to protect the system from external fake sync-signals. The server stores the received sync-signals in its datastore along with the servers current timestamp.

The webapp has a separate route for the end-user which serves a website with the corresponding audio tracks, e.g., multiple tracks for multiple languages. The website embeds an HTML5 audio element to playback tracks which can be streamed from the server. When a user starts an audio track, the website's client-side JavaScript starts the synchronization process: it sends an HTTP GET request to the server to retrieve the last sync-signal of the video. This signal contains the last received video playback position, the server timestamp when this signal was received and the current server timestamp. The client-side script also measures the duration of the GET request. The client-side script calculates the current position as follows: ((current server timestamp−server timestamp when signal received)+last video playback position+GET request duration). If the difference between the result of this calculation and the current audio playback position exceeds a certain threshold, the client-side script sets the audio playback position to the result of this calculation. This synchronization process is repeated periodically. Because different hardware, operating systems, browsers and network connections result in different latencies when adjusting the position of audio players, this latency is measured and added as an offset to the next synchronization cycle. This is achieved by regularly comparing the actual player position with the required player position according to the last adjustment and elapsed time since this adjustment. The webapp server also sends "server sent events" about received video events like play, pause, ended, rewind, which the audio client receives through a JavaScript EventSource and adjusts the audio player accordingly. To allow multiple screens for large events, the logged in administrator can also start secondary video playbacks on separate devices that synchronize to the primary video using the same mechanism as the end-user's audio playback.

Figure 3:
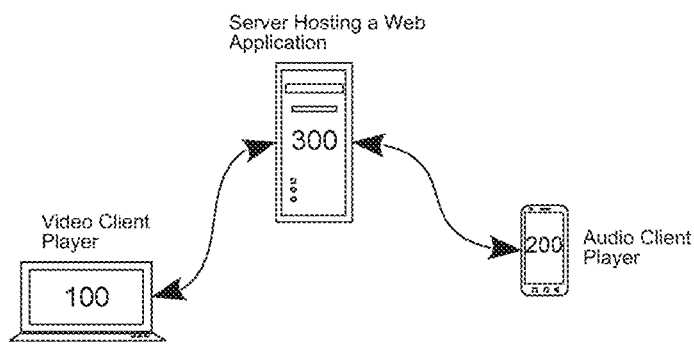
FIG. 3 This figure represents a schematic view of the computer network.

FIG. 3 represents a preferred embodiment of the computer network where the method is implemented. In this example, the network comprises a server hosting the web application (300) in data communication with a video playback device hosting the video client player (100), and also in data communication with a mobile device hosting the audio client player (200).

FIG. 1 shows a sequence diagram that illustrates the interaction between the browser used to play back the video (100), the end-user's browser used to play back the audio tracks (200) and the backend server hosting the web-application (300). The first interaction with the webapp is the administrator loading the login form (101 and 301) and logging in (102, 302). In other embodiments this may be skipped which wouldn't make the subsequent operations impossible, but leaving the video playback and sync signalling open on the internet would allow playback of multiple instances and could result in uncontrolled interfering sync signals. After successful login (102) the server responds with a web-page that allows the video playback (302), This can be a video playback streamed from the server (300) over the internet or this page can optionally offer to load the file from the local machine.

Other embodiments may use third party video providers as the video source. After the video player is started (103), the client-side script will periodically send the current playback position to the server (111 and 112) which stores this position along with the server's current timestamp in a datastore (311 and 321). Other embodiments may send additional information about player events like "play, pause, ended, rewind" to the server. The end-user's interactions start with loading the website with the audio players (201). When an end-user presses "play" on an audio-track (202), the client-side script will immediately start a sync cycle (203, 204 and 312) which is also described in FIG. 2. The cycle starts with a request to the server for the last video playback position (203) which is returned by the server along with the time-stamp when this signal was received and the current server time-stamp (312). This information is used to determine the correct playback position as described in FIG. 2.

Additionally, the client player (200) could periodically measure the system specific delay of adjusting the playback time and add it as an offset to the target playback position. The sync cycle is repeated periodically (213, 214). In one embodiment the interval length could be adapted to the result of the last sync cycle. e.g., if the audio playback was already in sync, the next interval can be much longer and vice versa. In other embodiments the system could include "server sent events" that inform the audio playback client player (200) about events like "play, pause, ended, rewind" to adjust the audio playback timely to events that occurred on the video playback side (100).

Figure 2:
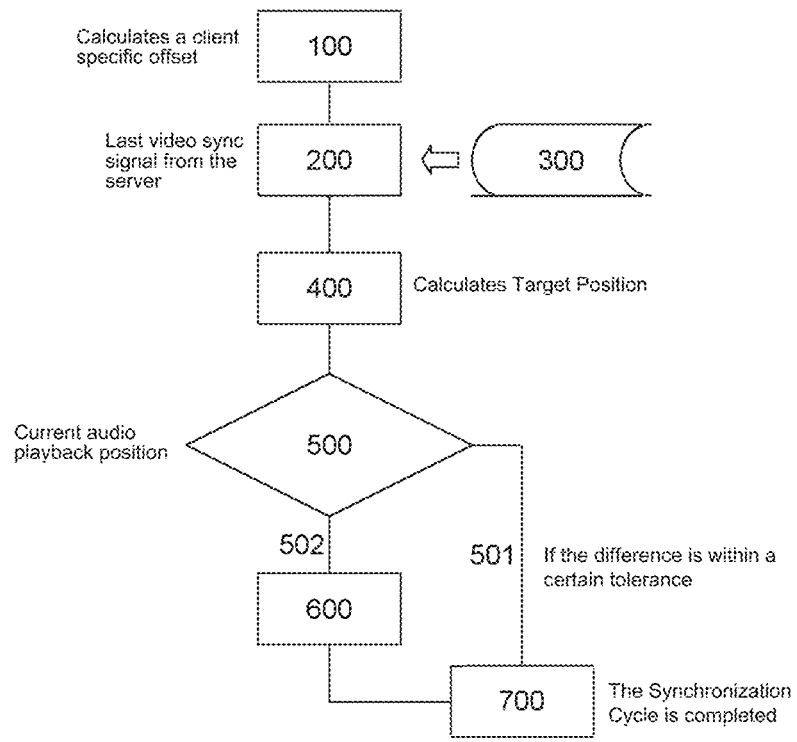
FIG. 2 This figure represents a flowchart of an embodiment of the method.

FIG. 2 represents a flow chart that illustrates the sync cycle in the audio player client. When the sync cycle starts, it first calculates a client specific offset (100). This offset is the time the audio player needs to set its current time to a new position and continue playing. It depends on various factors like hardware, operating system, browser and network connectivity. It is calculated with the following formula: client offset=(current time−last sync timestamp+the playback position the player was set to during last sync)−current audio playback position. In other words: the client offset is the time, the audio player lags behind the time it was set to. In other embodiments this step may be left out or the calculation may be done independently of the sync cycle and may also adjust the current player position accordingly. The next step is to get the last video sync signal from the server (200). This is returned from the server, along with the server timestamp when the signal was received and the current server timestamp. The client also measures the duration of the server call to take this into account of the subsequent calculation. The next step (400) calculates the target position for the audio player based on the previously retrieved data with the following formula: target position=(current server timestamp−server timestamp when signal received)+video playback position+server call duration. This target position is compared with the current audio playback position (500). If the difference is within a certain tolerance (501) the synchronization cycle is completed (700). Otherwise, the audio playback position is set to the target position plus the previously calculated client offset. This value and the current timestamp are stored for the next client offset calculation (100). Other embodiments may skip the threshold comparison (500) and always set the new playback position.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The invention claimed is:

1. A method for synchronizing a playback of an audio file with an associated video file,
wherein the method comprises:
periodically sending, by a video client player configured to playback the associated video file, a video playback position (VP) of the associated video file to a web application hosted by a server configured to store;
the video playback position (VP) of the associated video file and a timestamp at reception (RTS) of the video playback position (VP) in a data store of the server;
requesting, using an audio client player configured to playback the audio file, the video playback position (VP);
receiving, by the audio client player, a last stored video playback position, a timestamp at reception (RTS) of the last stored video playback position, and a current server timestamp (CTS) from the web application; and
computing, by the audio client player being further configured to compute an audio playback position (AP), the audio playback position (AP) with the last stored video playback position, the timestamp at reception (RTS) of the last stored video playback position, and the current server timestamp (CTS);
wherein the audio playback position (AP) is computed by the audio client player according to:
audio playback position (AP)=last stored video playback position+k(current server timestamp (CTS)−timestamp at reception (RTS) of the last stored video playback position), with k being a number that is greater than or equal to 0.

2. The method according to claim 1, wherein the method further comprises:
obtaining, by the audio client player, a current audio playback position (CAP) of the audio file; and
when an absolute difference between the current audio playback position (CAP) and the computed audio playback position (AP) is higher than a certain threshold (TH);
setting, by the audio client player, the playback of the audio file at the computed audio playback position (AP).

3. The method according to claim 2, wherein the threshold (TH) value is from 5 ms to 350 ms.

4. The method according to claim 1, wherein the method further comprises:
computing, by the audio client player, an audio client offset (AO) to compensate client side delays; and
adding, by the audio client player, the audio client offset (AO) to the computed audio playback position (AP).

5. The method according to claim 1, wherein the method further comprises:
receiving, by the audio client player, a video playback position request delay time (RD), and adding, by the audio client player, the video playback position request delay time (RD) to the computed audio playback position (AP).

6. The method according to claim 5, wherein the video playback position request delay time (RD) comprises a network latency associated with the audio client player requesting the last stored video playback position and receiving the last stored video playback position.

7. The method according to claim 1, wherein the method further comprises:

authenticating the audio client player with the web application.

8. The method according to claim 1, wherein the method further comprises:
sending, by the video client player, reproduction event signals corresponding to a status of the video playback to the web application; and
sending, by the web application, reproduction event signals to the audio client player.

9. The method according to claim 1, wherein the method comprises:
periodically requesting, by the audio client player, video playback position (VP) to the web application.

10. The method according to claim 1, wherein the video client player is hosted in the server or is hosted in a video playback device.

11. The method according to claim 1, wherein the audio client player is hosted in a mobile device.

12. The method according to claim 1, wherein the video file is stored in the server or is hosted in a video playback device.

13. The method according to claim 1, wherein one or more of the server and the audio client player hosts a plurality of audio files, each audio file corresponding to a different language.

14. The method according to claim 1, wherein one or more of the video client player and the audio client player are encrypted or protected by user credentials.

15. The method according to claim 1, wherein the computer network comprises a plurality of synchronized video client players.

16. The method according to claim 1, wherein a value of the number k is from 0.9 to 1.1.

17. The method according to claim 1, further comprising:
determining, by the audio client player, a corrected audio playback position by taking into account network latency associated with a communication between the audio client player and the server.

18. A server in a system for synchronizing a playback of an audio file with an associated video file, the server being in a computer network comprising an audio client player configured to playback the audio file, and a video client player configured to playback the video file;
wherein the server is configured to host a web application and wherein the server comprises a data store;
wherein the web application is arranged to:
periodically receive, from the video client player, a video playback position (VP) of the video file;
store the video playback position (VP) of the video file and a timestamp at reception (RTS) of the video playback position (VP) in the data store;
receive a request from the audio client player for a video playback position (VP);
send to the audio client player a last stored video playback position (VP), the timestamp at reception (RTS) of the last stored video playback position (VP), and a current server timestamp (CTS);
wherein the last stored video playback position (VP), the timestamp at reception (RTS) of the last stored video playback position (VP), and the current server timestamp (CTS) enable the audio client player to compute the audio playback position according to:
audio playback position (AP)=last stored video playback position (VP)+k(current server timestamp (CTS)−timestamp at reception (RTS) of the last stored video playback position (VP)), with k being a number that is greater than or equal to zero.

19. A method of using a server to determine an audio playback position for an audio device of an audio client player to set a reproduction of an audio file in the audio device such that output audio of the audio device is synchronized with video being reproduced in a separate video device,
wherein the method comprises using the server to:
periodically store a video playback position (VP) and a timestamp at reception (RTS) of the video playback position (VP) received from the video device;
after receipt of a request sent from the audio device, determine the audio playback position for the audio device by calculating:
audio playback position (AP)=last stored video playback position+ (current server timestamp (CTS)−timestamp at reception (RTS) of a last stored video playback position); and
cause the audio device to generate the output audio synchronized with the video being reproduced in the separate video device.

20. An audio client player in a system for synchronizing a playback of an audio file with an associated video file, the audio client player being configured to playback the audio file, and being in a computer network comprising a server, and a video client player configured to playback the associated video file;
wherein the audio client player is arranged to:
send a request to the server for a video playback position (VP);
receive from the server a last stored video playback position received from the video client player, a timestamp at reception (RTS) of the last stored video playback position, and a current server timestamp (CTS);
wherein the last stored video playback position, the timestamp at reception (RTS) of the last stored video playback position, and the current server timestamp (CTS) enable the audio client player to compute the audio playback position according to:
audio playback position (AP)=last stored video playback position (VP)+k(current server timestamp (CTS)−timestamp at reception (RTS) of the last stored video playback position (VP)), with k being a number that is greater than or equal to zero.

* * * * *